US010374718B2

(12) United States Patent
Onuma et al.

(10) Patent No.: US 10,374,718 B2
(45) Date of Patent: Aug. 6, 2019

(54) OPTICAL TRANSMISSION DISTORTION COMPENSATION DEVICE, OPTICAL TRANSMISSION DISTORTION COMPENSATION METHOD, AND COMMUNICATION DEVICE

(71) Applicants: NTT ELECTRONICS CORPORATION, Yokohama-shi, Kanagawa (JP); NIPPON TELEGRAPH AND TELEPHONE CORPORATION, Tokyo (JP)

(72) Inventors: Yasuharu Onuma, Kanagawa (JP); Etsushi Yamazaki, Kanagawa (JP); Hiroyuki Nouchi, Kanagawa (JP); Tomohiro Takamuku, Kanagawa (JP); Katsuichi Oyama, Kanagawa (JP); Kazuhito Takei, Kanagawa (JP); Masanori Nakamura, Kanagawa (JP); Mitsuteru Yoshida, Kanagawa (JP); Masahito Tomizawa, Kanagawa (JP)

(73) Assignees: NTT ELECTRONICS CORPORATION, Yokohama-shi, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/094,857

(22) PCT Filed: Jun. 21, 2017

(86) PCT No.: PCT/JP2017/022871
§ 371 (c)(1),
(2) Date: Oct. 18, 2018

(87) PCT Pub. No.: WO2018/042838
PCT Pub. Date: Mar. 8, 2018

(65) Prior Publication Data

US 2019/0132051 A1 May 2, 2019

(30) Foreign Application Priority Data

Aug. 29, 2016 (JP) ................................ 2016-167086

(51) Int. Cl.
*H04B 10/60* (2013.01)
*H04B 10/40* (2013.01)
(Continued)

(52) U.S. Cl.
CPC ......... *H04B 10/40* (2013.01); *H04B 10/5161* (2013.01); *H04B 10/58* (2013.01); *H04B 10/6163* (2013.01)

(58) Field of Classification Search
CPC .......................................... H04B 10/616–6166
See application file for complete search history.

(56) References Cited

U.S. PATENT DOCUMENTS

| | | | | |
|---|---|---|---|---|
| 6,400,233 B1 * | 6/2002 | Thomas | H03C 3/40 | 329/304 |
| 8,811,538 B1 * | 8/2014 | Manku | H03D 3/009 | 375/322 |

(Continued)

FOREIGN PATENT DOCUMENTS

| | | |
|---|---|---|
| JP | 2001-060883 A | 3/2001 |
| JP | 4268760 B2 | 2/2009 |

(Continued)

OTHER PUBLICATIONS

International Search Report (with English Translation) and Written Opinion dated Jul. 18, 2017 issued in International Application No. PCT/JP2017/022871.

(Continued)

*Primary Examiner* — Shi K Li
(74) *Attorney, Agent, or Firm* — Myers Wolin, LLC

(57) ABSTRACT

An I component compensation unit calculates an I component in which a distortion has been compensated, by forming a first polynomial expressing the distortion of the I component based on an I component and a Q component of a quadrature modulation signal and multiplying each term of (Continued)

the first polynomial by a first coefficient. A Q component compensation unit calculates a Q component in which a distortion has been compensated, by forming a second polynomial expressing the distortion of the Q component based on the I component and the Q component of the quadrature modulation signal and multiplying each term of the second polynomial by a second coefficient. A coefficient calculation unit calculates the first and second coefficients by comparing outputs of the I component compensation unit and the Q component compensation unit and a known signal.

13 Claims, 10 Drawing Sheets

(51) Int. Cl.

| | |
|---|---|
| ***H04B 10/58*** | (2013.01) |
| ***H04B 10/61*** | (2013.01) |
| ***H04B 10/516*** | (2013.01) |

(56) References Cited

U.S. PATENT DOCUMENTS

| | | | |
|---|---|---|---|
| 2008/0025381 | A1 | 1/2008 | Lee et al. |
| 2016/0099776 | A1 | 4/2016 | Nakashima et al. |

FOREIGN PATENT DOCUMENTS

| | | | |
|---|---|---|---|
| JP | 2012-182793 | A | 9/2012 |
| JP | 2016-034121 | A | 3/2016 |
| JP | 2016-072942 | A | 5/2016 |

OTHER PUBLICATIONS

Japanese Office Action of corresponding Japanese Application No. 2016-167086 (with Partial English Translation) dated Jan. 23, 2018.

Japanese Office Action of corresponding Japanese Application No. 2016-167086 (with Partial English Translation) dated Jun. 27, 2017.

Sugihara, Takashi, "Recent Progress of Pre-equalization Technology for High-speed Optical Communication," The Institute of Electronics, Information and Communication Engineers, Shingakugihou, IEICE Technical Report, OCS2011-41, p. 83-88, with Partial English Translation, Jul. 2011.

English translation of the Written Opinion of the International Searching Authority issued for corresponding International Patent Application No. PCT/JP2017/022871 dated Jan. 7, 2019. (English Language Translation Attached).

English translation of the International Preliminary Report on Patentability issued for corresponding International Patent Application No. PCT/JP2017/022871 dated Mar. 14, 2019. (English Language Translation Attached).

* cited by examiner

OPTICAL TRANSMISSION DISTORTION COMPENSATION DEVICE, OPTICAL TRANSMISSION DISTORTION COMPENSATION METHOD, AND COMMUNICATION DEVICE

CROSS-REFERENCE TO RELATED APPLICATIONS

This application is a National Stage entry of International Application No. PCT/JP2017/022871, filed Jun. 21, 2017, which claims priority to Japanese Patent Application No. 2016-167086, filed Aug. 29, 2016. The disclosures of the priority applications are incorporated in their entirety herein by reference.

FIELD

The present invention relates to an optical transmission distortion compensation device, an optical transmission distortion compensation method and a communication device that are used for quadrature modulation communication in data communication.

BACKGROUND

In coherent optical communication, quadrature modulation is employed in which amplitude modulation is independently performed for each of an in-phase component (I component) and a quadrature phase component (Q component). The increase in transmission rate has been achieved by multi-level modulation such as QPSK (Quadrature Phase Shift Keying) and 16QAM (Quadrature Amplitude Modulation). For a further speed-up, level multiplication to 64QAM or the like has been also promoted. On the receiving side, an optical signal is converted into an electric signal by an optical demodulator, and after A/D conversion, the distortion of a transmission path is compensated. Therefore, by digital signal processing, chromatic dispersion compensation, polarization processing/adaptive equalization and error correction are performed, leading to an increase in receiving sensitivity.

As a problem that becomes conspicuous in the case of using the multi-level modulation such as QPSK, 16QAM and 64QAM, there is constellation distortion (IQ distortion). A multi-level modulated signal is treated as an electric signal with four lanes (the I component and Q component of an X polarized wave and the I component and Q component of a Y polarized wave), at an electric stage. That is, on the transmitting side, the signal is generated as an electric signal with four lanes, and is converted into a multi-level modulated signal by an optical modulator.

As the optical modulator, for example, a Mach-Zhebnder interferometer type modulator is applied. Such an optical modulator has imperfection due to errors of bias voltage, a finite extinction ratio of the interferometer and the like, and by such an imperfection, constellation distortion is generated. When constellation distortion is generated, the sent information cannot be exactly decoded, causing an increase in bit error rate, and the like. Here, a constellation is also called a signal space diagram, and a data signal point by digital modulation that is shown on a two-dimensional complex plane (a point that is shown by the I component and Q component of the complex plane).

For example, the 16QAM and the 64QAM are modulation schemes having constellations with 16 points and 64 points respectively, and generally, the 16 points and the 64 points are arranged on a signal space in square shapes respectively. The 16QAM can be regarded as a modulation in which four-level amplitude modulations independent from each other are performed to the in-phase component and quadrature component respectively, and the 64QAM can be regarded as a modulation in which eight-level amplitude modulations independent from each other are performed to the in-phase component and quadrature component respectively.

As one kind of constellation distortion, there is a DC (Direct Current) offset. Typically, a bias voltage is applied to the optical modulator, such that the optical output is a null point. When the bias voltage shifts from the null point, the DC offset is generated. Further, in the Mach-Zehnder interferometer constituting the optical modulator, it is ideal that the optical output is absolutely zero when the extinction ratio (ON/OFF ratio) is infinite, that is, OFF. However, when the optical output is not absolutely zero at the time of OFF, the extinction ratio is not infinite, and the DC offset is generated. The DC offset appears as a remaining carrier in the optical signal, and therefore, can be confirmed by observing the spectrum of the optical signal.

The DC offset and the remaining of the carrier due to this are caused also by a direct detection scheme that is not a coherent detection scheme using a local oscillating laser (for example, a scheme of a directly detecting the intensity of an ON-OFF signal of 1010 with a photodetector, which is also called an intensity modulation direct detection and the like). In the direct detection scheme, the remaining carrier appears as the DC offset again, at an electric stage on the receiving side, and therefore, can be easily removed by an analog DC block circuit having a capacitor and the like. On the other hand, in the coherent detection scheme, when there is no exact coincidence in frequency between a transmitting laser and the local oscillating laser on the receiving side, the remaining carrier is not converted into direct current at the electric stage on the receiving side, and cannot be removed by the DC block circuit.

Further, as constellation distortion, IQ (In-phase Quadrature) crosstalk is known. The IQ crosstalk occurs when the phase difference between the in-phase component and the quadrature component is not exactly 90° due to a bias voltage error of the optical modulator.

For coping with these problems with constellation distortion, there is disclosed a technology of previously measuring the characteristic of optical modulator to be applied in an optical transmitting device and compensating the characteristic of the optical modulator with a digital signal processing device in the transmitting device (for example, see NPL 1). Further, there is disclosed a technology of calibrating, on the receiver side, a distortion called a quadrature error that is caused by the gain unbalance and phase unbalance between the I-Q signal components, when the quadrature modulation is used in wireless communication (for example, see PTL 1).

CITATION LIST

Patent Literature

[PTL 1] JP 2012-182793 A

Non Patent Literature

[NPL 1] Sugihara Takashi, "Recent Progress of Pr-equalization Technology for High-speed Optical Communication", The Institute of Electronics, Information and Communication Engineers, Shingakugihou, IEICE Technical Report, OCS2011-41 (2011-7), p. 83-88

SUMMARY

Technical Problem

However, there is a problem in that it is not possible to use the technology described in NPL 1 when the characteristic of the optical modulator cannot be previously measured or when the characteristic changes as time passes. Particularly, them is a problem in that it is difficult for the digital signal processing device on the transmitting device side to compensate the fluctuation drift of an automatic bias control circuit that controls the bias voltage to be applied to the optical modulator and the imperfection of the optical modulator that is caused by an error of the application by the automatic bias control circuit.

Further, in the case where the unbalance between the I-Q signal components is calibrated on the receiving side as described in PTL 1, the unbalance is calibrated by the adjustment of the phase and the gain, in a uniform way, and therefore, there is a problem in that it is not possible to compensate the constellation distortion generated non-linearly.

The present invention has been made for solving the above-described problems, and an object thereof is to obtain an optical transmission distortion compensation device, an optical transmission distortion compensation method and a communication device that make it possible to accurately compensate the constellation distortion generated non-linearly.

Solution to Problem

An optical transmission distortion compensation device according to the present invention includes: an I component compensation unit calculating an I component in which a distortion has been compensated, by forming a first polynomial expressing the distortion of the I component based on an I component and a Q component of a quadrature modulation signal and multiplying each term of the first polynomial by a first coefficient; a Q component compensation unit calculating a Q component in which a distortion has been compensated, by forming a second polynomial expressing the distortion of the Q component based on the I component and the Q component of the quadrature modulation signal and multiplying each term of the second polynomial by a second coefficient; and a coefficient calculation unit calculating the first and second coefficients by comparing outputs of the I component compensation unit and the Q component compensation unit and a known signal.

Advantageous Effects of Invention

The present invention makes it possible to accurately compensate the constellation distortion generated non-linearly.

DESCRIPTION OF EMBODIMENTS

An optical transmission distortion compensation device, an optical transmission distortion compensation method and a communication device according to the embodiments of the present invention will be described with reference to the drawings. The same components will be denoted by the same symbols, and the repeated description thereof may be omitted.

Embodiment 1

Figure 1:
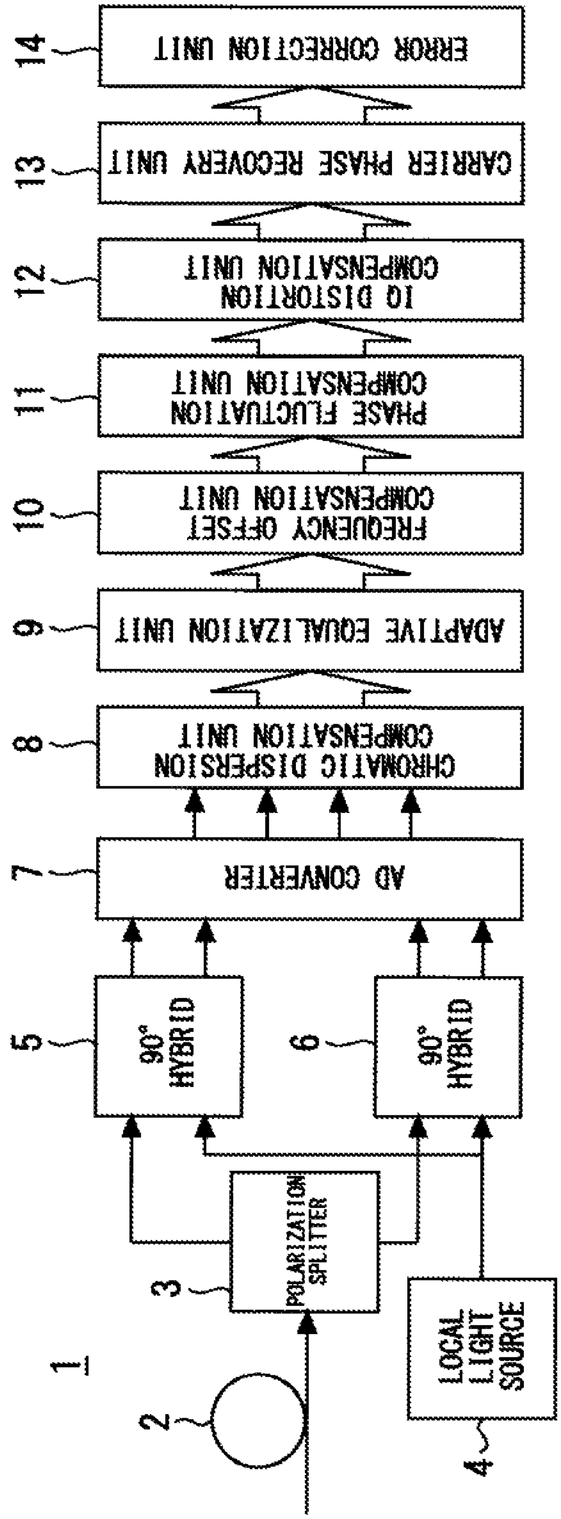
FIG. 1 is a diagram showing a receiving device of a coherent optical communication device according to an embodiment 1 of the present invention.

FIG. 1 is a diagram showing a receiving device of a coherent optical communication device according to an embodiment 1 of the present invention. A receiving device 1 converts an optical signal received from an optical fiber 2, into an electric signal, and performs digital processing.

In the receiving device 1, first, a polarization splitter 3 divides the optical signal into two quadrature polarized components. These optical signals and a local light from a local light source 4 are input to 90° hybrid circuits 5, 6, and four output lights in total of a pair of output lights resulting from the interfering with each other in phase and in reverse phase and a pair of output lights resulting from interfering with each other in quadrature phase (90°) and in reverse quadrature phase (−90°) are obtained. These output lights are converted into analog signals by photodiodes (not illustrated), respectively. These analog signals are converted into digital signals by an AD converter 7.

The configuration from a chromatic dispersion compensation unit 8 is an optical transmission distortion compensation device that performs digital processing of quadrature modulation signals output from the AD converter 7 as the digital signals, to compensate distortion. Here, during the propagation of the optical signal in the optical fiber 2, the signal waveform is distorted by the effect of chromatic dispersion. The chromatic dispersion compensation unit 8 estimates the magnitude of the distortion from the received signals, and compensates the distortion.

In optical communication, when a horizontally polarized wave and a vertically polarized wave are multiplexed and sent and this is divided at the receiving time, polarization fluctuation occurs by the effect of the polarization mode dispersion and the waveform is distorted. An adaptive equalization unit 9 performs an equalization process of compensating the distortion. The polarization demultiplexing is initially performed by an optical demodulator, and the polarization demultiplexing is processed in the adaptive equalization unit 9 more completely. There has been proposed, for example, a method of inserting a known long-period pattern signal or a known short-period pattern signal on the transmitting side and minimizing the error between the known signal and the received signal.

A frequency offset compensation unit 10 compensates a frequency error of a local signal (carrier signal) for transmitting and receiving. A phase fluctuation compensation unit 1 performs compensation processing of the remaining offset in the frequency offset compensation unit 10 and the remaining phase fluctuation or phase slip that has failed to be removed by the adaptive equalization unit 9, using the known short-period pattern signal inserted on the transmitting side.

An IQ distortion compensation unit 12 compensates an IQ-planar distortion (IQ distortion) such as a DC offset and a distortion by the extinction ratio. It is preferable that the compensation of the IQ distortion be performed in a state where the phase fluctuation and the phase slip have been reduced by the frequency offset compensation unit 10 and the phase fluctuation compensation unit 11.

The carrier phase recovery unit 13 compensates the phase fluctuation that has failed to be removed by the frequency offset compensation unit 10 and the phase fluctuation compensation unit 11. A gap $\phi$ between a tentatively determined constellation (signal point) and a received constellation (signal point) is detected, and the compensation is performed by performing phase rotation by $\phi$. The compensation by the phase rotation can be performed by the multiplication by $\exp(j\phi)$. Thereafter, processing of an error correction unit 14 is performed.

Here, for a distortion that does not greatly fluctuate, as exemplified by the statical distortion of the optical modulator, a certain degree of compensation can be performed even on the transmitting side. However, for a distortion that is generated by the bias adjustment of the optical modulator, or the like, and that fluctuates dynamically, it is difficult to perform the compensation on the transmitting side. The compensation on the receiving side has a characteristic of making it easy to cope with the distortion that fluctuates dynamically.

Figure 2:
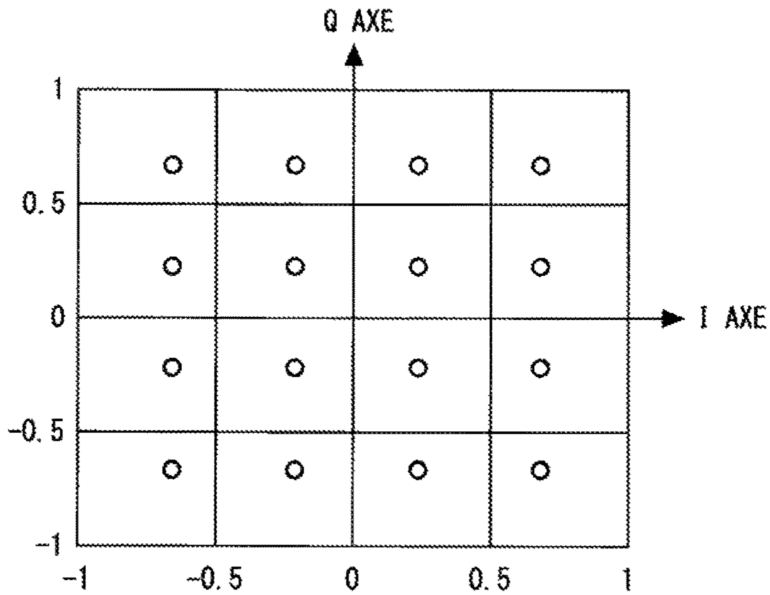
FIG. 2 is a diagram showing a constellation in the 16QAM modulation when there is no distortion.
Figure 3:
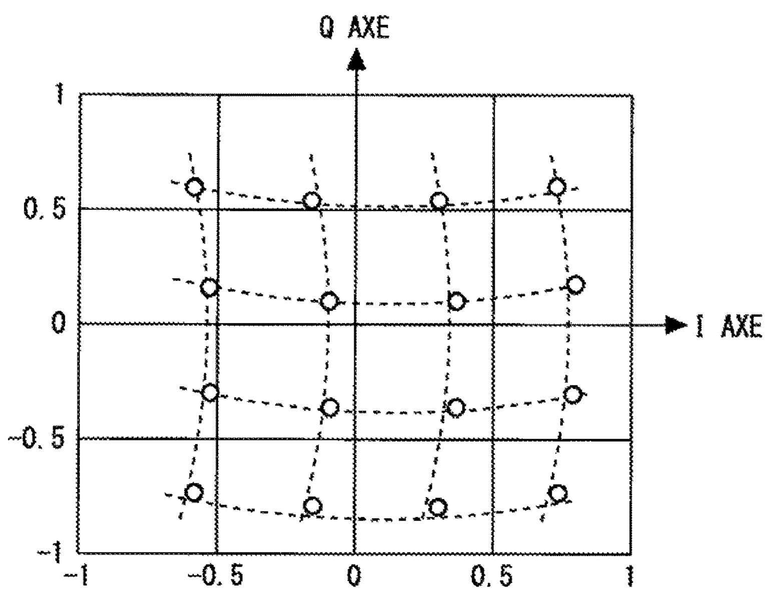
FIG. 3 is a diagram showing a constellation in the 16QAM when the distortion of the I component and the Q component is generated.

FIG. 2 is a diagram showing a constellation in the 16QAM modulation when there is no distortion. FIG. 3 is a diagram showing a constellation in the 16QAM when the distortion of the I component and the Q component is generated. The distortion of the constellation on the receiving side in optical communication is not a distortion in which the DC component is merely offset in a uniform way, but a distortion having an arch shape. This is thought to be due to the non-linearity of the quadrature modulator and the quadrature demodulator. Hereinafter, the distorion component that changes in an arch shape on the IQ plane is referred to as the arch-shaped distortion. The arch-shaped distortion cannot be compensated simply by offsetting the DC component in conventional methods.

Figure 4:
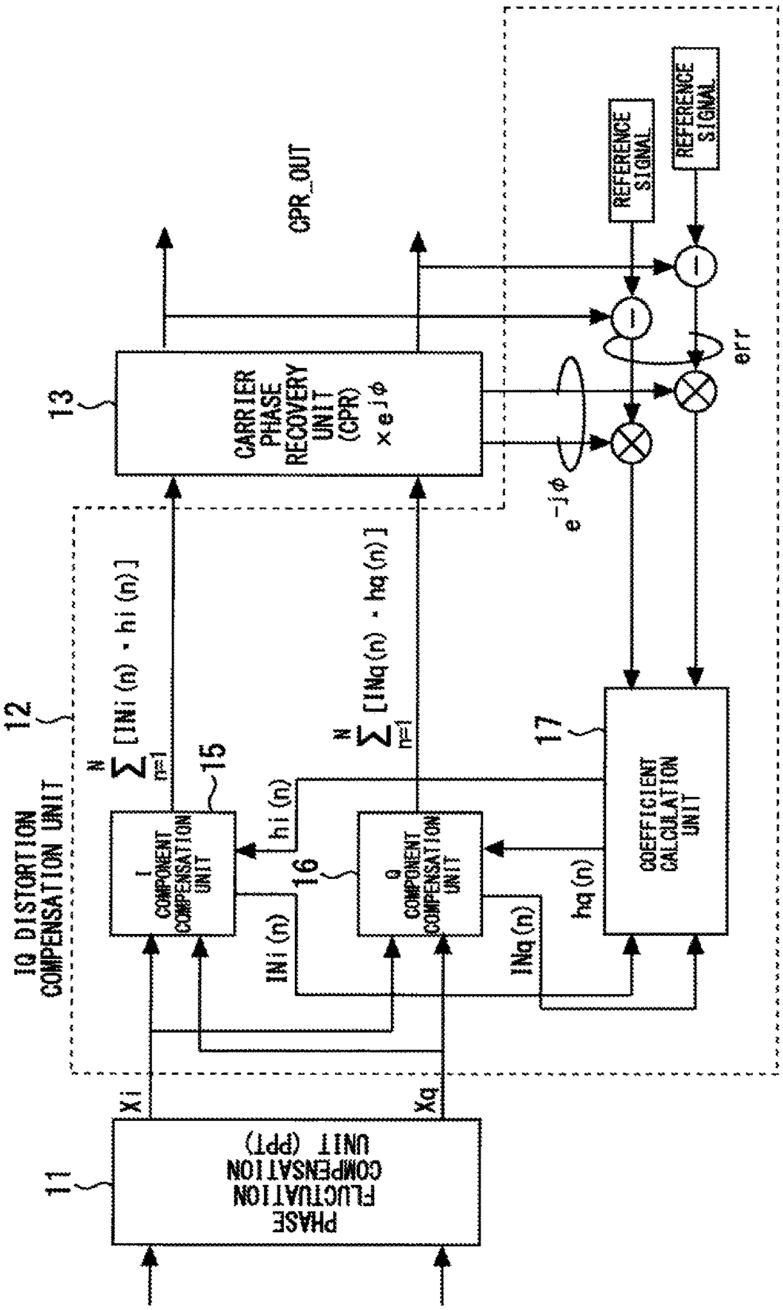
FIG. 4 is a diagram showing an optical transmission distortion compensation device according to the embodiment 1 of the present invention.

FIG. 4 is a diagram showing an optical transmission distortion compensation device according to the embodiment 1 of the present invention. The IQ distortion compensation unit 12 is provided between the phase fluctuation compensation unit 11 and the carrier phase recovery unit 13, and includes an I component compensation unit 15, a Q component compensation unit 16 and a coefficient calculation unit 17.

The I component compensation unit 15 calculates an I component in which the distortion has been compensated, by forming a first N-term polynomial expressing the distortion of the I component based on an I component Xi and Q component Xq of the quadrature modulation signal output from the phase fluctuation compensation unit 11 and multiplying each term of the first polynomial by a first coefficient for the I component compensation unit output from the coefficient calculation unit 17. When the n-th term of the first polynomial constituted by the I component and the Q component is INi(n) and the coefficient of the n-th term of the first polynomial is hi(n), the output of the I component compensation unit 15 is expressed by the following formula.

[Math. 1]

$$\sum_{n=1}^{N}[INi(n)\cdot hi(n)] = INi(1)\cdot hi(1)+INi(2)\cdot hi(2)\ \ldots\ +INi(N)\cdot hi(N)$$

The Q component compensation unit 16 calculates a Q component in which the distortion has been compensated, by forming a second N-term polynomial expressing the distortion of the Q component based on the I component Xi and Q component Xq of the quadrature modulation signal output from the phase fluctuation compensation unit 11 and multiplying each term of the second polynomial by a second coefficient for the Q component compensation output from the coefficient calculation unit 17. When the n-th term of the second polynomial constituted by the I component and the Q component is INq(n) and the coefficient of the n-th term of the second polynomial is hq(n), the output of the Q component compensation unit 16 is expressed by the following formula.

[Math. 2]

$$\sum_{n=1}^{N}[INq(n)\cdot hq(n)] = INq(1)\cdot hq(1)+INq(2)\cdot hq(2)\ \ldots\ +INq(N)\cdot hq(N)$$

The above process is performed for each symbol, and the coefficient of each term is independently optimized in the coefficient calculation unit 17. Since the coefficient of each term is a first-order, the instantaneous value can be used, and a memory is unnecessary.

The carrier phase recovery unit 13 rotates, by $\phi$, the phase of a signal vector constituted by the I component and the Q component, for compensating the phase fluctuation of the output of the I component compensation unit 15 and the Q component compensation unit 16. Accordingly, the output of the carrier phase recovery unit 13 is expressed by the following formula.

[Math. 3]

$$\text{CPR\_OUT} = \left[\sum_{n=1}^{N} INi(n)\cdot hi(n) + j\sum_{n=1}^{N} INq(n)\cdot hq(n)\right]\times e^{j\phi}$$

The coefficient calculation unit 17 calculates the first and second coefficients by comparing the outputs of the I component compensation unit 15 and the Q component compensation unit 16 and a reference signal (known signal), for each term of the first and second polynomials before the multiplication by the first and second coefficients. Specifically, the first and second coefficients are calculated such that the error between the output of the carrier phase recovery unit 13 and the reference signal is minimized. The error includes the phase rotation compensation in the carrier phase recovery unit 13. Therefore, for cancelling this, a reverse rotation phase is given to the error, and then the error is supplied to the coefficient calculation unit 17. Here, as the reference signal, for example, the known long-period pattern signal (for example, 256 bits per 10000 bits) inserted into the transmitting signal for synchronous detection can be used. By setting a pseudo random signal as the known long-period pattern signal, the arch-shaped distortion on the IQ axes shown in FIG. 3 is easily detected. In the case of the repeat of only 1 and 0, the distortion has linear shape, and therefore, the detection of the arch-shaped distortion is difficult.

Figure 5:
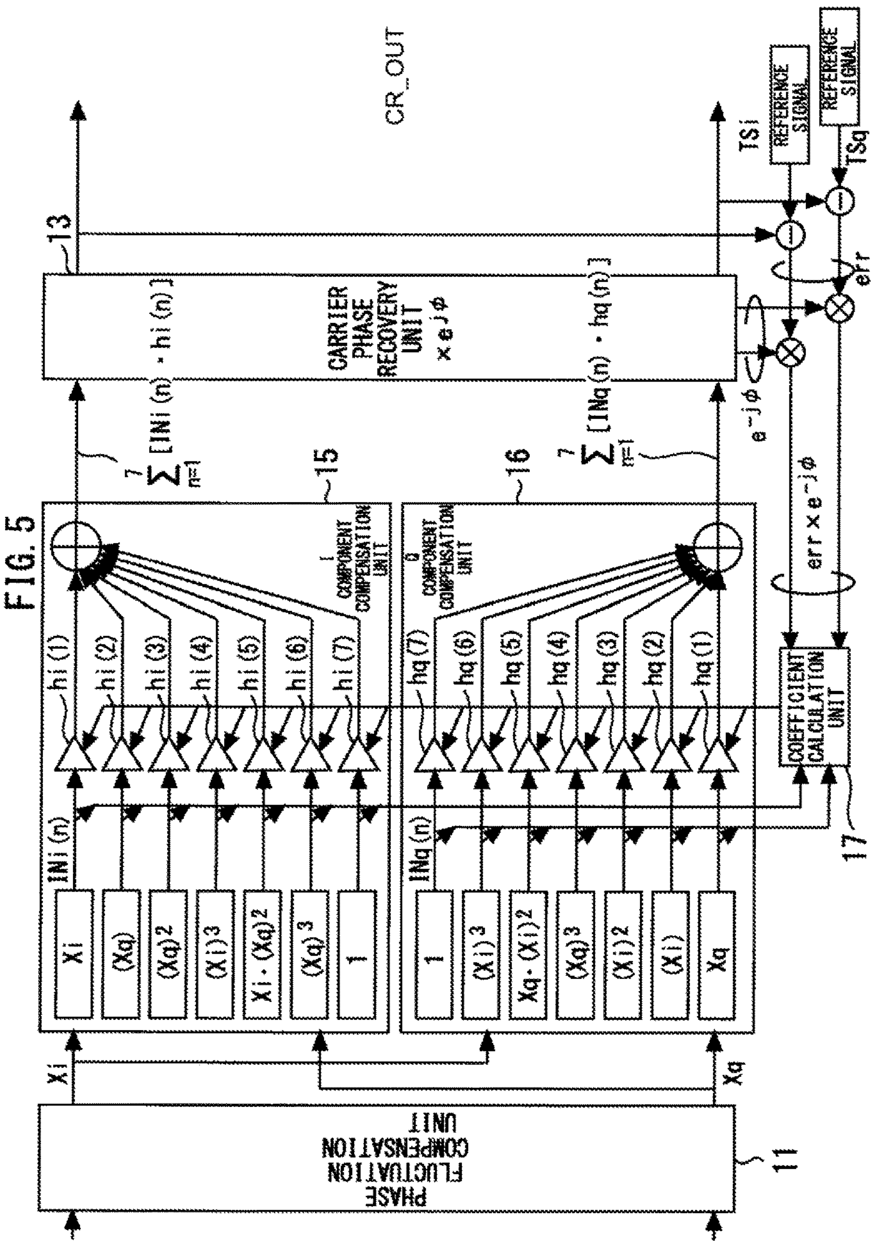
FIG. 5 is a diagram showing the I component compensation unit and the Q component compensation unit according to the embodiment 1 of the present invention.

FIG. 5 is a diagram showing the I component compensation unit and the Q component compensation unit according to the embodiment 1 of the present invention. Here, N=7 is satisfied. The distortion is approximated using some terms of a Voltera series expansion that is used as a formula expressing the non-linearity. This is equivalent to a non-linear filter. The increase or decrease of the term numbers of the first and second polynomials, the use of another axis component and the increase or decrease of the order numbers are set based on the technical idea "the arch-shaped distortion can be expressed by a polynomial".

The output of the I component compensation unit 15 is expressed by the following polynomial based on the I component Xi and Q component Xq from the phase fluctuation compensation unit 11.

[Math. 4]

$$\sum_{n=1}^{7}[INi(n)\cdot hi(n)] = Xi\cdot hi(1) + Xq\cdot hi(2) + Xq^2\cdot hi(3) + Xi^3\cdot hi(4) + Xi\cdot Xq^2\cdot hi(5) + Xq^3\cdot hi(6) + 1\cdot hi(7)$$

The output of the Q component compensation unit 16 is expressed by the following polynomial base on the I component Xi and Q component Xq from the phase fluctuation compensation unit 11.

[Math. 5]

$$\sum_{n=1}^{7}[INq(n)\cdot hq(n)] = Xq\cdot hq(1) + Xi\cdot hq(2) + Xi^2\cdot hq(3) + Xq^3\cdot hq(4) + Xq\cdot Xi^2\cdot hq(5) + Xi^3\cdot hq(6) + 1\cdot hq(7)$$

As shown in FIG. 3, the arch-shaped distortion changes in an arch shape along the I axis, and changes in an arch shape along the Q axis. It is expected that this is expressed by a quadratic curve and cubic curve for the I component and a quadratic curve and cubic curve for the Q component in a pseudo manner. The second terms, the third terms and the sixth terms of the above formulas are aimed at that.

Each of the fifth terms is a correction term for preventing the curvature of the arch shape from changing depending on the difference of the quadrant. Each of the first terms adjusts the amplitude to compensate the difference in the amplification factor at the time of the IQ combination on the transmitting side and at the time of the IQ division on the receiving side and the variation of the amplitude ratio that is generated by the difference in load on the I component and Q component lines. The modulation output for control signal in the modulator has a nonlinearity in a shape similar to a sine curve, and therefore, each of the fourth terms is a term for approximating it by a cubic curve and restoring a linear shape. Each of the seventh terms corresponds to a conventional compensation for the DC offset.

The coefficients hi(1) to hi(7) and coefficients hq(1) to hq(7) of the terms of the above polynomials are independently calculated by the coefficient calculation unit 17.

By the above result, the output of the I component compensation unit 15 and the Q component compensation unit 16 is shown by the following signal vector.

[Math. 6]

$$\sum_{n=1}^{7} INi(n)\cdot hi(n) + j\sum_{n=1}^{7} INq(n)\cdot hq(n)$$

For the signal vector, the phase is rotated by ϕ, by the phase rotation compensation of the carrier phase recovery unit 13. An output CR_OUT of the carrier phase recovery unit 13 is expressed by the following Formula.

[Math. 7]

$$CR\_OUT = \sum_{n=1}^{7}\left[= INi(n)\cdot hi(n) + j\sum_{n=1}^{7} INq(n)\cdot hq(n)\right]\times e^{j\phi}$$

When the known long-period pattern signal inserted into the transmitting signal is received, an error err is calculated by subtracting the true value (reference signal: TSi+jTSq) of the known long-period pattern signal from CR_OUT.

[Math. 8]

$$err = \left[\sum_{n=1}^{7} INi(n)\cdot hi(n) + j\sum_{n=1}^{7} INq(n)\cdot hq(n)\right]\times e^{j\phi} - (TSi + jTSq)$$

Here, in the I component compensation unit 15 and the Q component compensation unit 16, the phase rotation compensation by the carrier phase recovery unit 13 has not been performed yet. Accordingly, when the coefficient calculation is performed with the error err between the result from performing the phase rotation compensation and the reference signal, the influence of the phase rotation compensation is included, and the coefficients for compensating the IQ distortion cannot be properly calculated. Hence, the data to be input to the coefficient calculation unit 17 is set to $err\times e^{-j\Phi}$, by operating the error err for cancelling the phase rotation compensation. This is equivalent to the reference signal to which the phase rotation compensation has been performed.

Figure 6:
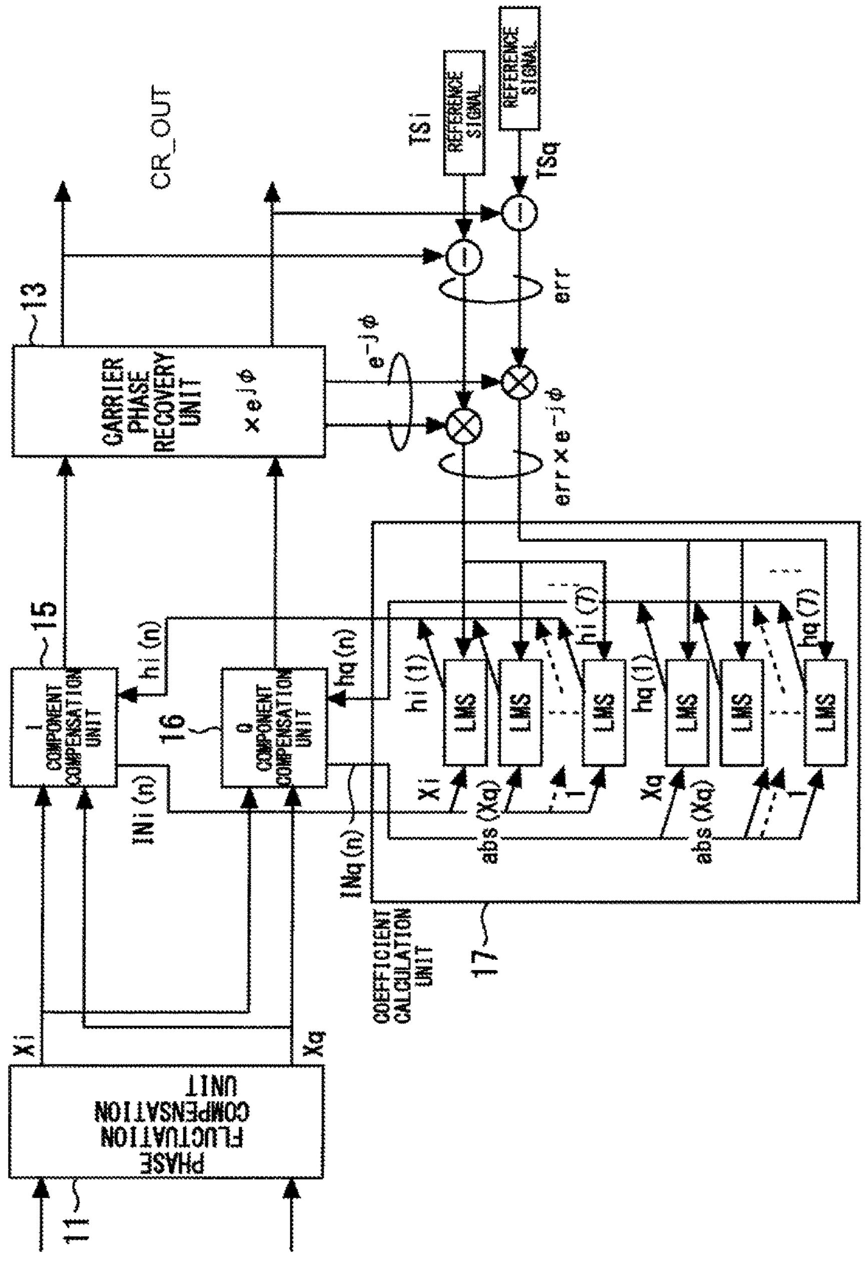
FIG. 6 is a diagram showing the coefficient calculation unit according to the embodiment 1 of the present invention.

FIG. 6 is a diagram showing the coefficient calculation unit according to the embodiment 1 of the present invention. The coefficient calculation unit 17 evaluates all coefficients of the terms of the polynomials for the I component compensation unit 15 and the Q component compensation unit 16, using a least mean square (LMS) algorithm. The LSM algorithm at this time is expressed by the following formulas.

[Math. 9]

$$hi(n)_{k+1} = hi(n)_k + \mu\cdot\left(-\frac{\partial |E_k|^2}{\partial hi(n)_k}\right)$$

-continued $$hq(n)_{k+1} = hq(n)_k + \mu \cdot \left( -\frac{\partial |E_k|^2}{\partial hq(n)_k} \right)$$

$$\frac{\partial |E_k|^2}{\partial hi(n)} = -INi(n) \cdot \text{Real}[err \cdot e^{-j\phi}]$$

$$\frac{\partial |E_k|^2}{\partial hq(n)} = -INq(n) \cdot \text{Real}[err \cdot e^{-j\phi}]$$

Here, k represents the number of times of updates of the calculation, and the update is performed for each symbol in the known long-period pattern signal. $E_k$ expresses a general error that is input for the k-th time. Incidentally, the input signals INi(n), INq(n), the error err and the phase rotation amount $\phi$ also have different values for each k, but the sign of k is omitted in the lower formulas. Further, is a coefficient of 1 or less.

As shown in the above formulas, in the LSM algorithm, the next coefficients $hi(n)_{k+1}$, $hq(n)_{k+1}$ are evaluated from the current coefficients $hi(n)_k$, $hq(n)_k$, the error err×$e^{-j\Phi}$ and the input signals Xi, Xq, such that the error is minimized. The convergence value changes depending on input situation.

The initial values of the coefficients can be set, for example, as hi(1)=1, hi(2)=hi(3)=hi(4)=hi(5)=hi(6)=hi(7)=0, hq(1)=1, and hq(2)=hq(3)=hq(4)=hq(5)=hq(6)=hq(7)=0. This shows that the input signals are output with no change. The initial values are not limited to the above example.

As described above, in the embodiment, by expressing the IQ distortion as the polynomials, it is possible to accurately compensate a constellation distortion that is generated non-linearly, for example, an arch-shaped distortion.

Further, the coefficient calculation unit 17 calculates the first and second coefficients, using the least mean square algorithm. Thereby, it is possible to calculate the coefficients quickly and simply, compared to the case of using a general minimum mean square error (MMSE) algorithm.

Further, by providing the IQ distortion compensation unit 12 at the previous stage of the carrier phase recovery unit 13, it is possible to increase the phase compensation accuracy of the carrier phase recovery that is easily influenced by the IQ distortion.

Further, the coefficient calculation unit 17 calculates the first and second coefficients, using the result from performing the reverse compensation process of the compensation in the carrier phase recovery unit 13, to the error between the output of the carrier phase recovery unit 13 and the known signal. Thereby, it is possible to remove the influence of the phase rotation compensation and accurately calculate the coefficients for compensating the IQ distortion, and therefore, it is possible to increase the performance of the IQ distortion compensation.

Further, by providing the IQ distortion compensation unit 12 at the subsequent stage of the phase fluctuation compensation unit 11, it is possible to perform the IQ distortion compensation process after reducing the influence of the phase fluctuation. Accordingly, it is possible to accurately calculate the coefficients for compensating the IQ distortion, and to increase the accuracy of the IQ distortion compensation.

Embodiment 2

Figure 7:
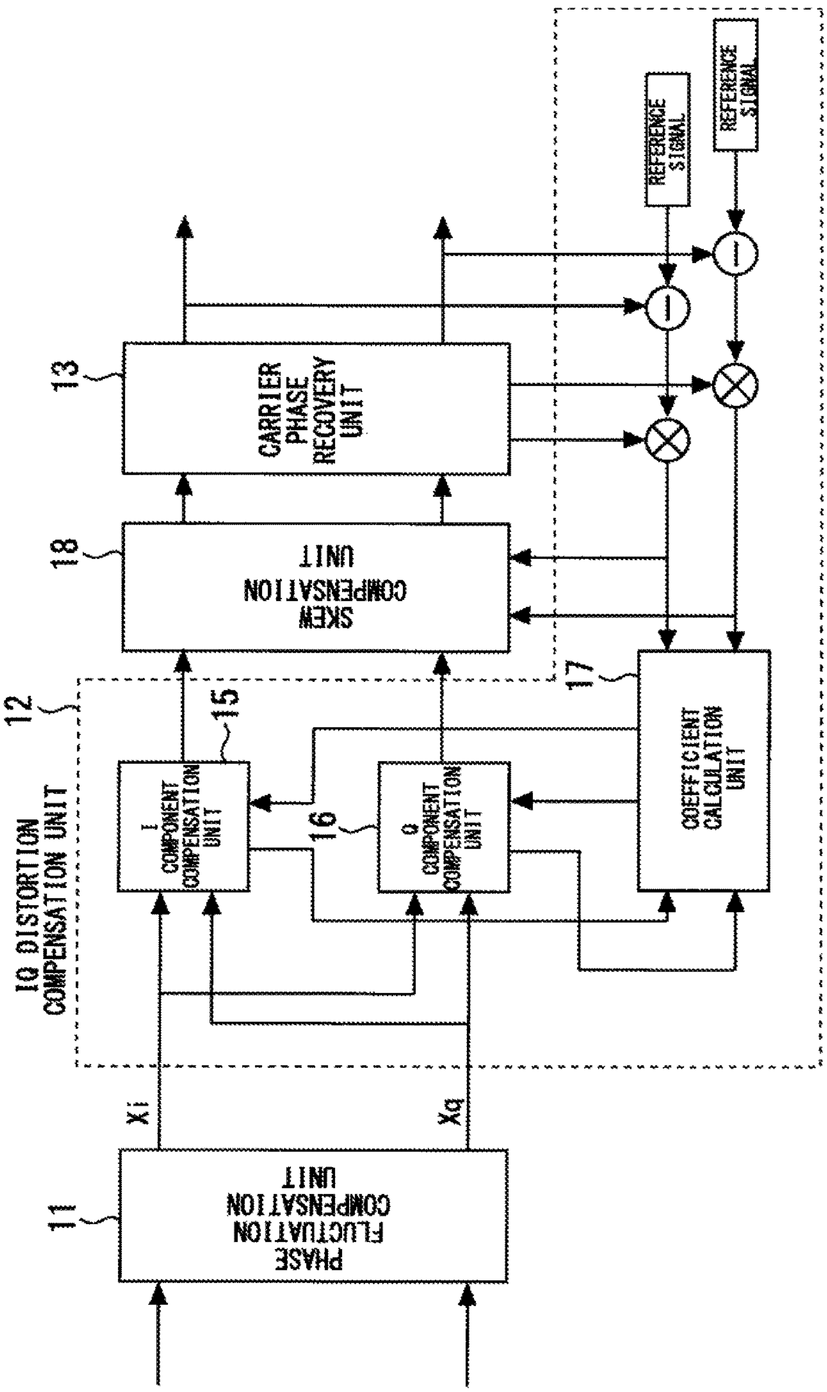
FIG. 7 is a diagram showing an optical transmission distortion compensation device according to an embodiment 2 of the present invention.

FIG. 7 is a diagram showing an optical transmission distortion compensation device according to an embodiment 2 of the present invention. A skew compensation unit 18 is provided between the IQ distortion compensation unit 12 and the carrier phase recovery unit 13. The addition of the skew compensation unit 18 changes the coefficient derivation formulas in the coefficient calculation unit 17. The other configuration is the same as that in the embodiment 1.

Figure 8:
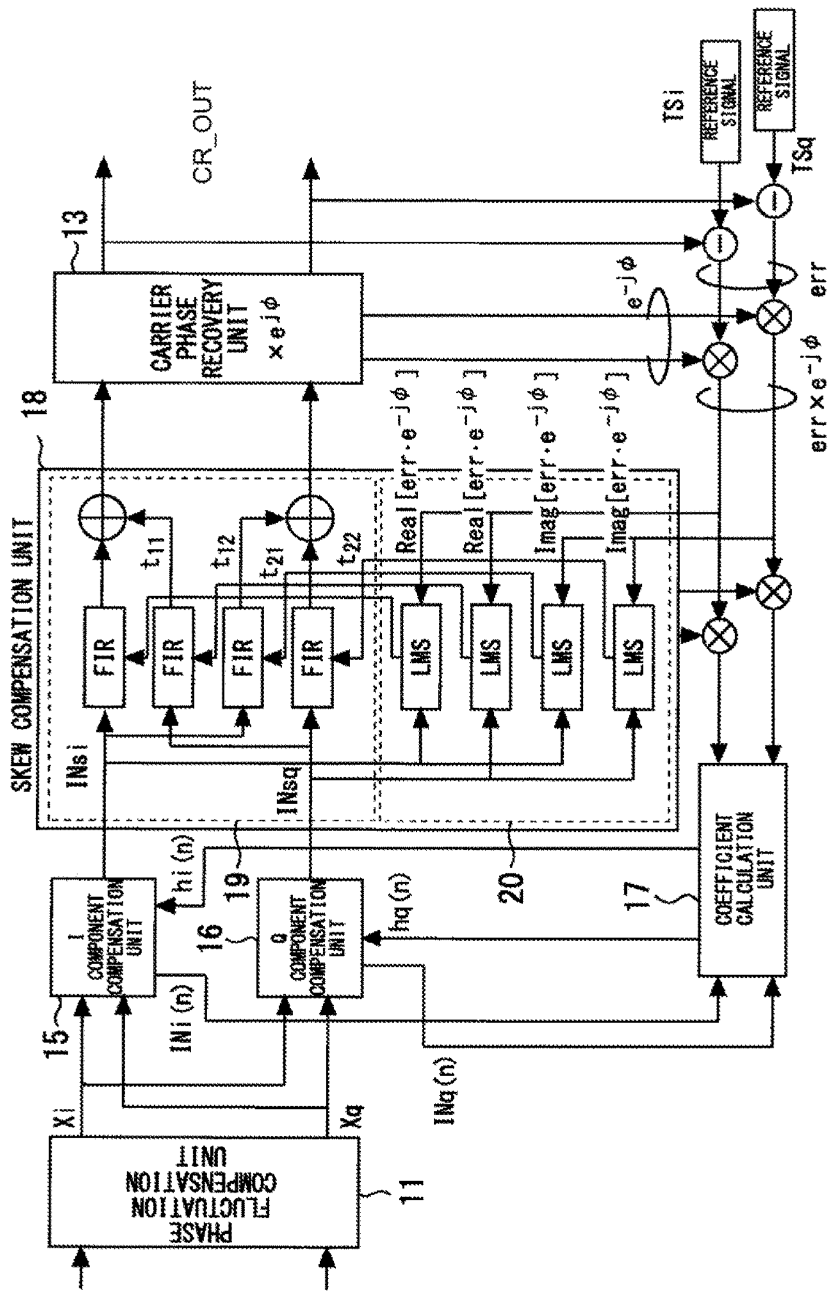
FIG. 8 is a diagram showing the skew compensation unit according to the embodiment 2 of the present invention.

FIG. 8 is a diagram showing the skew compensation unit according to the embodiment 2 of the present invention. The skew compensation unit 18 performs a skew compensation for compensating the delay difference between the I component signal and the Q component signal mainly at the time of transmitting. The skew compensation unit 18 includes a filter 19 that performs the skew compensation of the outputs of the I component compensation unit 15 and the Q component compensation unit 16, and a filter coefficient calculation unit 20 that calculates the filter coefficient of the filter 19 using the result from performing, to the error err, the reverse compensation process of the compensation in the carrier phase recovery unit 13. The filter 19 is constituted by butterfly type FIR filters, in consideration of the crosstalk between the I component and the Q component. The tap coefficients of the FIR filters are represented by $t_{11}$, $t_{12}$, $t_{21}$, $t_{22}$, respectively. For example, in the case of five-step FIR filters, each FIR filter has five tap coefficients. The filter coefficient calculation unit 20 includes LMS algorithms respectively corresponding to the FIR filters.

The output of the FIR filter is expressed by the convolution of the input signals and the tap coefficients. The convolution is expressed by ⊗, and when the input signal from the I component compensation unit 15 to the skew compensation unit 18 is INsi and the input from the Q component compensation unit 16 to the skew compensation unit 18 is INsq, the output of the carrier phase recovery unit 13 is expressed by the following formula.

$$\begin{aligned} CR\_OUT &= [(INsi \otimes t_{11} + INsq \otimes t_{12}) + j(INsi \otimes t_{21} + INsq \otimes t_{22})] \times e^{j\phi} \\ &= [INsi \otimes (t_{11} + j \cdot t_{21}) + INsq \otimes (t_{12} + j \cdot t_{22})] \times e^{j\phi} \end{aligned} \quad \text{[Math. 10]}$$

That is, the output of the carrier phase recovery unit 13 is a value resulting from rotating, by the phase amount, the sum of a value resulting from convoluting (t11+j·t21) to INsi that is a Real component of the input of the skew compensation unit 18 and a value resulting from convoluting (t12+j·t22) to INsq that is an Imag component.

The inputs of the skew compensation unit 18 are the outputs of the I component compensation unit 15 and the Q component compensation unit 16, and therefore, the above formula is shown as follows.

$$CR\_OUT = \left[ \sum_{n=1}^{7} (INi(n) \cdot hi(n)) \otimes (t_{11} + j \cdot t_{21}) + \sum_{n=1}^{7} (INq(n) \cdot hq(n)) \otimes (t_{12} + j \cdot t_{22}) \right] \times e^{j\phi} \quad \text{[Math. 11]}$$

Similarly to the embodiment 1, the error err is calculated by subtracting the true value of the known long-period pattern signal from the output of the carrier phase recovery unit 13 shown by the above formula.

$$err = \left[ \sum_{n=1}^{7} (INi(n) \cdot hi(n)) \otimes (t_{11} + j \cdot t_{21}) + \right. \quad \text{[Math. 12]}$$

-continued $$\left.\sum_{n=1}^{7}(INq(n)\cdot hq(n))\otimes(t_{12}+j\cdot t_{22})\right]\times e^{j\phi}-(TSi+jTSq)$$

The result ($err\times e^{-j\Phi}$) from performing to the error err, the reverse compensation process of the compensation in the carrier phase recovery unit 13 is supplied to the LMS algorithms that calculate the coefficients of the FIR filters in the skew compensation unit 18. To each of the LMS algorithms that calculate the filter coefficients $t_{11}$, $t_{12}$, Real[$err\cdot e^{-j\Phi}$] that is a real part is supplied. To each of the LMS algorithms that calculate the filer coefficients $t_{21}$, $t_{22}$, Imag [$err\cdot e^{-j\Phi}$] that is an imaginary part is supplied.

At this time, the calculation formulas in the LMS algorithms for the filter coefficients $t_{11}$, $t_{12}$, $t_{21}$, $t_{22}$ are shown as follows. By updating the LMS algorithms, the sets of the tap coefficients of the FIR filters are obtained.

[Math. 13]

$$t_{11}(k+1)=t_{11}(k)+\mu\frac{\partial|E_k|^2}{\partial t_{11}(k)}$$

$$t_{12}(k+1)=t_{12}(k)+\mu\frac{\partial|E_k|^2}{\partial t_{12}(k)}$$

$$t_{21}(k+1)=t_{21}(k)+\mu\frac{\partial|E_k|^2}{\partial t_{21}(k)}$$

$$t_{22}(k+1)=t_{22}(k)+\mu\frac{\partial|E_k|^2}{\partial t_{22}(k)}$$

$$\frac{\partial|E_k|^2}{\partial t_{11}}=-INsi\cdot\mathrm{Real}[err\cdot e^{-j\phi}]$$

$$\frac{\partial|E_k|^2}{\partial t_{12}}=-INsq\cdot\mathrm{Real}[err\cdot e^{-j\phi}]$$

$$\frac{\partial|E_k|^2}{\partial t_{21}}=-INsi\cdot\mathrm{Imag}[err\cdot e^{-j\phi}]$$

$$\frac{\partial|E_k|^2}{\partial t_{22}}=-INsq\cdot\mathrm{Imag}[err\cdot(j)^{*}e^{-j\phi}]$$

Here, k represents the number of times of updates of the calculation, and the update can be performed for each symbol in the known long-period pattern signal. $E_k$ expresses a general error that is input to the LMS for the k-th time. Incidentally, the input signals INsi, INsq, the error err and the phase rotation amount $\phi$ also have different values for each k, but the sign of k is omitted in the above formulas.

The initial values of the coefficients can be set, for example, as $t_{11}=\{0, 0, 1, 0, 0\}$, $t_{12}=\{0, 0, 0, 0, 0\}$, $t_{21}=\{0, 0, 0, 0, 0\}$ and $t_{22}=\{0, 0, 1, 0, 0\}$. This shows that the input signals are output with no change. The initial values are not limited to the above example.

Meanwhile, the coefficient calculation unit 17 uses the LMS algorithms for evaluating the coefficients hi(n), hq(n) of the polynomials in the I component compensation unit 15 and the Q component compensation unit 16. The formulas of the LSM algorithms at this time are shown as follows.

[Math. 14]

$$hi(n)_{k+1}=hi(n)_k+\mu\cdot\left(-\frac{\partial|E_k|^2}{\partial hi(n)_k}\right)$$

$$hq(n)_{k+1}=hq(n)_k+\mu\cdot\left(-\frac{\partial|E_k|^2}{\partial hq(n)_k}\right)$$

-continued $$\frac{\partial|E_k|^2}{\partial hi(n)}=-INi(n)\cdot\mathrm{Real}[err\otimes(t_{11}+j\cdot t_{21})^{*}\cdot e^{-j\phi}]$$

$$\frac{\partial|E_k|^2}{\partial hq(n)}=-INq(n)\cdot\mathrm{Real}[err\otimes(t_{12}+j\cdot t_{22})^{*}\cdot e^{-j\phi}]$$

Here, k represents the number of times of updates of the calculation, and the update can be performed for each symbol in the known long-period pattern signal. $E_k$ expresses a general error that is input to the LMS for the k-th time. Incidentally, the input signals INsi, INsq, the error err and the phase rotation amount $\phi$ also have different values for each k, but the sign of k is omitted in the above formulas.

The initial values of the coefficients can be set, for example, as hi(1)=1, hi(2)=hi(3)=hi(4)=hi(5)=hi(6)=hi(7)=0, hq(1)=1, and hq(2)=hq(3)=hq(4)=hq(5)=hq(6)=hq(7)=0. This shows that the input signals are output with no change. The initial values are not limited to the above example.

In the case where the skew compensation unit 18 is provided at the subsequent stage of the IQ distortion compensation unit 12, the error $E_k$ to be input to the LMS algorithms is the result from cancelling an amount corresponding to the skew compensation and an amount corresponding to the carrier phase recovery for the error err that is calculated at the output of the carrier phase recovery unit 13. Actually, they are given to the reference signal. The terms added on the right side of err in the above formulas are aimed at that process.

As described above, the coefficient calculation unit 17 calculates the first and second coefficients, using the result from performing, to the error err, the reverse compensation process of the compensations in the skew compensation unit 18 and the carrier phase recovery unit 13. Thereby, it is possible to remove the influence of the skew and phase rotation compensations and accurately calculate the coefficients for compensating the IQ distortion, and therefore, it is possible to increase the performance of the IQ distortion compensation.

As described above, the IQ distortion compensation unit 12 is provided at the subsequent stage of the phase fluctuation compensation unit 11, for increasing the effect by performing the IQ distortion compensation in a state where the phase fluctuation and the phase slip have been reduced. However, when there is another processing unit that can remove the phase fluctuation or the phase slip, the IQ distortion compensation unit 12 may be provided at the subsequent stage.

Embodiment 3

Figure 9:
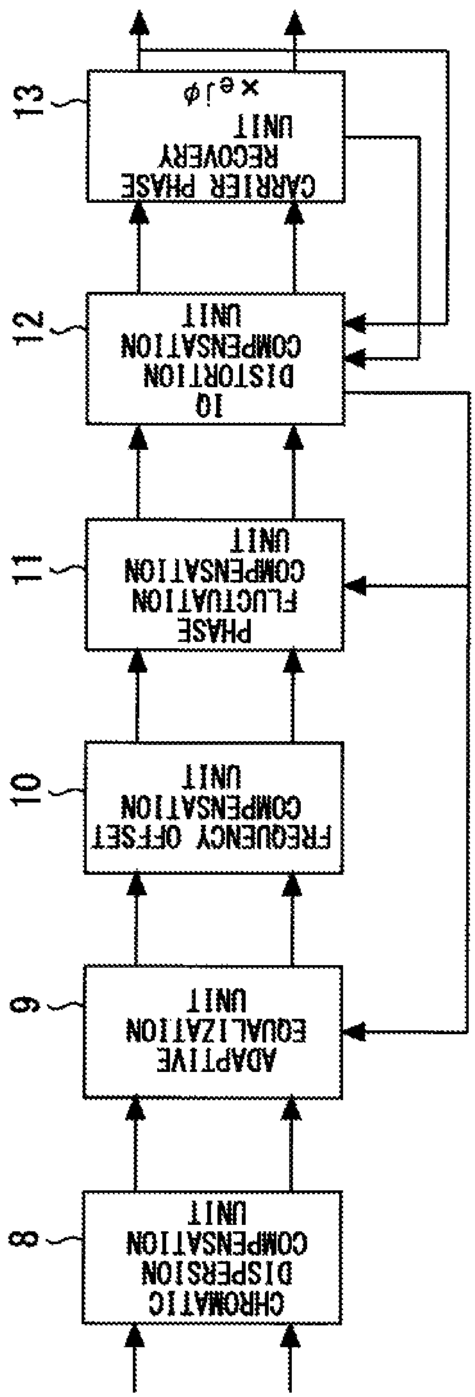
FIG. 9 is a diagram showing an optical transmission distortion compensation device according to an embodiment 3 of the present invention.

FIG. 9 is a diagram showing an optical transmission distortion compensation device according to an embodiment 3 of the present invention. The adaptive equalization unit 9 and the phase fluctuation compensation unit 11 respectively calculate a filter coefficient and a compensation amount for the equalization process and the compensation process, based on the error between the known signal and the receiving signal. For example, a known long-period pattern signal for synchronization that is arranged at the start position of packet data and that has a level of several hundreds of symbols, and a known short-period pattern signal that is arranged in the whole data at an interval of several tens of symbols can be used as the known signal for the adaptive equalization unit 9. The above known short-period pattern signal can be used as the known signal for the phase fluctuation compensation unit 11.

The IQ distortion remains in the receiving signal, to which the compensation has not been performed, but the IQ distortion is not included in the known signal. Therefore, the IQ distortion remains in the error between the two. Here, in the embodiment, the adaptive equalization unit 9 and the phase fluctuation compensation unit 11 calculate the filter coefficient and the compensation mount for the equalization process and the compensation process, using the known signal to which the IQ distortion evaluated from the calculation result of the coefficient calculation unit 17 has been added. Specifically, the IQ distortion is added to the known signal by the multiplication or addition with a reverse sign coefficient or compensation amount. Thereby, it is possible to accurately perform the equalization process and the compensation process in a state where the influence of the IQ distortion is not given or is significantly reduced to the coefficient calculation in the adaptive equalization unit 9 and the compensation amount calculation in the phase fluctuation compensation unit 11, and furthermore, it is possible to increase the effect of the IQ distortion compensation.

Embodiment 4

Figure 10:
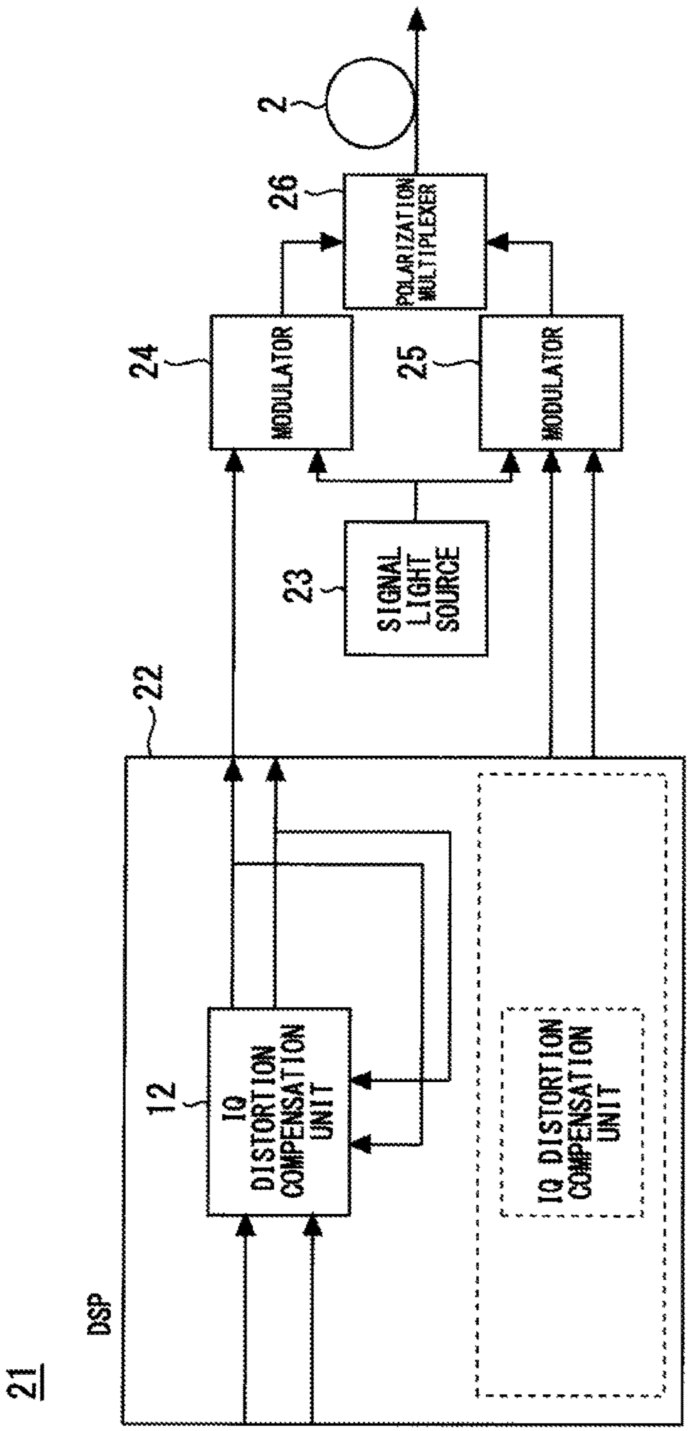
FIG. 10 is a diagram showing a transmitting device of a coherent optical communication device according to an embodiment 4 of the present invention.

FIG. 10 is a diagram showing a transmitting device of a coherent optical communication device according to an embodiment 4 of the present invention. In the embodiments 1 to 3, the case of applying the optical transmission distortion compensation device including the IQ distortion compensation unit 12 to the receiving device 1 has been described. However, in the embodiment, the optical transmission distortion compensation device is applied to a digital signal processing device (Digital Signal Processor: DSP) 22 of a transmitting device 21 that transmits an optical signal. Based on output signals of the DSP 22, modulators 24, 25 modulate an output light from a signal light source 23. Those output lights are multiplexed in a quadrature polarization state by a polarization multiplexer 26, and are output to the optical fiber 2.

Figure 11:
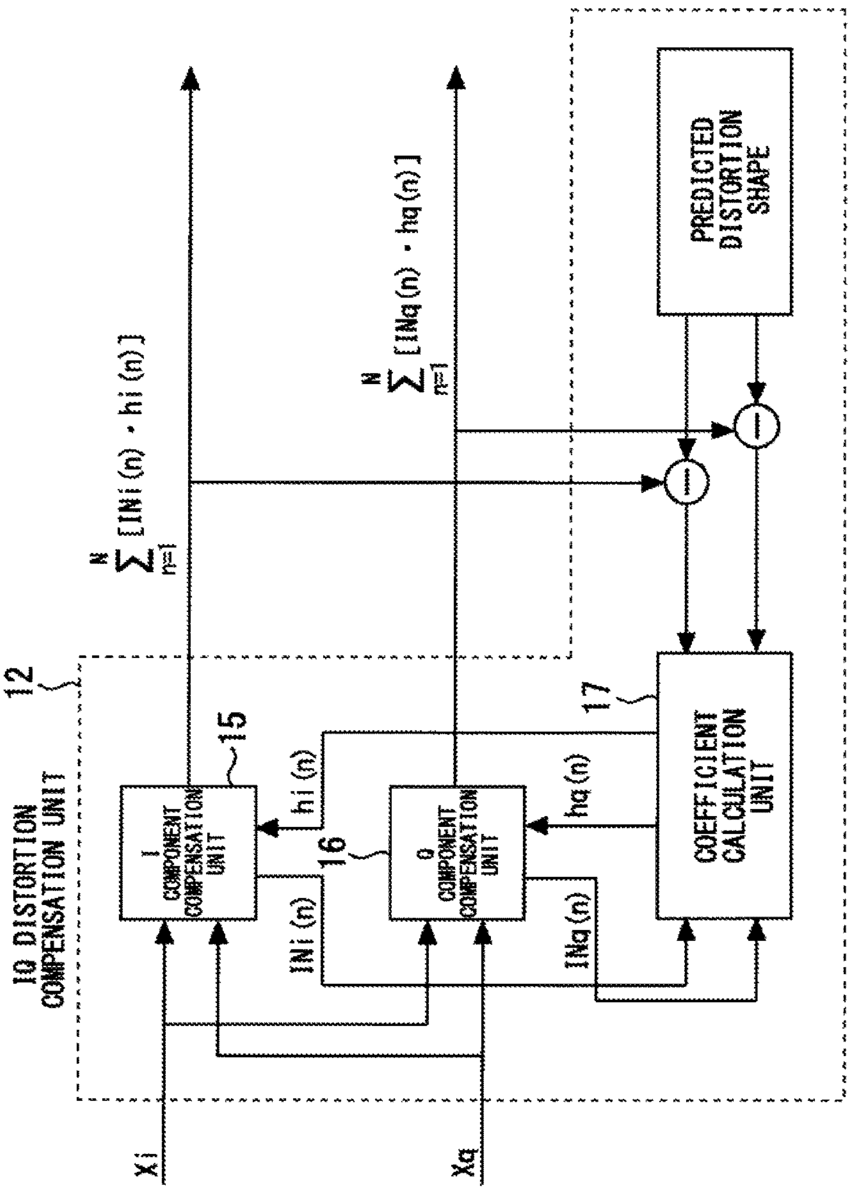
FIG. 11 is a diagram showing an optical transmission distortion device according to the embodiment 4 of the present invention.

FIG. 11 is a diagram showing an optical transmission distortion device according to the embodiment 4 of the present invention. The Q distortion compensation unit 12 on the transmitting side predicts the shape of the distortion due to the modulators 24, 25 and the like at the subsequent stage, and approximates the distortion by a polynomial. The coefficient calculation unit 17 calculates the first and second coefficients so as to minimize the error between the outputs of the I component compensation unit 15 and the Q component compensation unit 16 and the predicted distortion shape. In the coefficient calculation, an MMSE algorithm (Minimum Mean Square Error algorithm) can be applied. Thereby, it is possible to compensate the distortion due to the modulators and the like at the subsequent stage.

In the embodiments 1 to 4, only the X polarized wave has been described, but needless to say, the same method can be applied also to the Y polarized wave. Furthermore, the optical transmission distortion compensation may be performed by recording a program for realizing a function of the optical transmission distortion compensation method according to any one of the embodiments 1 to 4 in a computer-readable recording medium, making a computer system or a programmable logic device read the program recorded in the recording medium, and executing it. Note that the "computer system" here includes an OS and hardware such as a peripheral device or the like. In addition, the "computer system" also includes a WWW system including a homepage providing environment (or display environment). Furthermore, the "computer-readable recording medium" is a portable medium such as a flexible disk, a magneto-optical disk, a ROM or a CD-ROM, or a storage device such as a hard disk built in the computer system. Further, the "computer-readable recording medium" also includes the one holding the program for a fixed period of time, such as a volatile memory (RAM) inside the computer system to be a server or a client in the case that the program is transmitted through a network such as the Internet or a communication channel such as a telephone line. In addition, the program may be transmitted from the computer system storing the program in the storage device or the like to another computer system through a transmission medium or a transmission wave in the transmission medium. Here, the "transmission medium" that transmits the program is a medium having a function of transmitting information like the network (communication network) such as the Internet or the communication channel (communication line) such as the telephone line. Furthermore, the program may be the one for realizing a part of the above-described function. Further, it may be the one capable of realizing the above-described function by a combination with the program already recorded in the computer system, that is, a so-called difference file (difference program).

REFERENCE SIGNS LIST

1 receiving device, 9 adaptive equalization unit, 11 phase fluctuation compensation unit, 13 carrier phase recovery unit, 15 I component compensation unit, 16 Q component compensation unit, 17 coefficient calculation unit, 18 skew compensation unit, 19 filter, 20 filter coefficient calculation unit, 21 transmitting device

The invention claimed is:

1. An optical transmission distortion compensation device compensating a distortion in a receiving device comprising:

an I component compensation unit calculating an I component in which a distortion has been compensated, by forming a first polynomial expressing the distortion of the I component based on an I component and a Q component of a quadrature modulation signal and multiplying each term of the first polynomial by a first coefficient;

a Q component compensation unit calculating a Q component in which a distortion has been compensated, by forming a second polynomial expressing the distortion of the Q component based on the I component and the Q component of the quadrature modulation signal and multiplying each term of the second polynomial by a second coefficient; and a coefficient calculation unit calculating the first and second coefficients by comparing outputs of the I component compensation unit and the Q component compensation unit and a known signal.

2. The optical transmission distortion compensation device according to claim 1, wherein at least one of the first and second polynomials includes a term which compensates a distortion component that changes in an arch shape on an IQ plane.

3. The optical transmission distortion compensation device according to claim 2, wherein as the term which compensates the distortion component that changes in an arch shape, the first polynomial includes at least one of a first-order term of the Q component, a second-order term of the Q component and a third-order term of the Q component, and the second polynomial includes at least one of a first-order term of the I component, a second-order term of the I component and a third-order term of the I component.

4. The optical transmission distortion compensation device according to claim 1, wherein the first polynomial includes a third-order term of the I component, the second polynomial includes a third-order term of the Q component, and the optical transmission distortion compensation device compensates a nonlinearity of a transmitting modulator.

5. The optical transmission distortion compensation device according to claim 1, wherein the coefficient calculation unit calculates the first and second coefficients, using a least mean square algorithm.

6. A communication device comprising a receiving device receiving an optical signal, wherein the receiving device includes the optical transmission distortion compensation device according to claim 1.

7. A communication device comprising a transmitting and receiving device transmitting and receiving an optical signal, wherein the transmitting and receiving device includes the optical transmission distortion compensation device according to claim 1.

8. The optical transmission distortion compensation device according to claim 1, wherein the coefficient calculation unit calculates the first and second coefficients by comparing outputs of the I component compensation unit and the Q component compensation unit and a known signal for each symbol and optimizing the first and second coefficients of each term independently.

9. An optical transmission distortion compensation device comprising:

an I component compensation unit calculating an I component in which a distortion has been compensated, by forming a first polynomial expressing the distortion of the I component based on an I component and a Q component of a quadrature modulation signal and multiplying each term of the first polynomial by a first coefficient;

a Q component compensation unit calculating a Q component in which a distortion has been compensated, by forming a second polynomial expressing the distortion of the Q component based on the I component and the Q component of the quadrature modulation signal and multiplying each term of the second polynomial by a second coefficient;

a coefficient calculation unit calculating the first and second coefficients by comparing outputs of the I component compensation unit and the Q component compensation unit and a known signal; and a carrier phase recovery unit compensating phase fluctuation of outputs of the I component compensation unit and the Q component compensation unit, wherein the coefficient calculation unit calculates the first and second coefficients, using a result from performing a reverse compensation process of a compensation in the carrier phase recovery unit, to an error between an output of the carrier phase recovery unit and the known signal.

10. The optical transmission distortion compensation device according to claim 9, further comprising a skew compensation unit provided between the carrier phase recovery unit and each of the I distortion compensation unit and the Q distortion compensation unit, the skew compensation unit includes a butterfly type filter that performs a skew compensation of the outputs of the I component compensation unit and the Q component compensation unit, and a filter coefficient calculation unit that calculates a filter coefficient of the filter using the result from performing, to the error, the reverse compensation process of the compensation in the carrier phase recovery unit, and the coefficient calculation unit calculates the first and second coefficients, using a result from performing, to the error, the reverse compensation process of the compensations in the skew compensation unit and the carrier phase recovery unit.

11. An optical transmission distortion compensation device comprising:

an I component compensation unit calculating an I component in which a distortion has been compensated, by forming a first polynomial expressing the distortion of the I component based on an I component and a Q component of a quadrature modulation signal and multiplying each term of the first polynomial by a first coefficient;

a Q component compensation unit calculating a Q component in which a distortion has been compensated, by forming a second polynomial expressing the distortion of the Q component based on the I component and the Q component of the quadrature modulation signal and multiplying each term of the second polynomial by a second coefficient;

a coefficient calculation unit calculating the first and second coefficients by comparing outputs of the I component compensation unit and the Q component compensation unit and a known signal; and an adaptive equalization unit performing an equalization process to the quadrature modulation signal; and a phase fluctuation compensation unit performing a compensation process to the quadrature modulation signal, wherein the I component compensation unit and the Q component compensation unit are provided at a subsequent stage of the adaptive equalization unit and the phase fluctuation compensation unit, and the adaptive equalization unit and the phase fluctuation compensation unit calculate a filter coefficient and a compensation amount for the equalization process and the compensation process, using a known signal to which an IQ distortion evaluated from a calculation result of the coefficient calculation unit has been added.

12. An optical transmission distortion compensation method performed by an optical transmission distortion compensation device compensating a distortion in a receiving device, comprising:

calculating an I component in which a distortion has been compensated, by forming a first polynomial expressing the distortion of the I component based on an I component and a Q component of a quadrature modulation signal and multiplying each term of the first polynomial by a first coefficient;

calculating a Q component in which a distortion has been compensated, by forming a second polynomial expressing the distortion of the Q component based on the I component and the Q component of the quadrature modulation signal and multiplying each term of the second polynomial by a second coefficient; and calculating the first and second coefficients by comparing the I component and the Q component in which the distortion have been compensated and a known signal.

13. The optical transmission distortion compensation method according to claim 12, wherein the first and second coefficients are calculated by comparing the I component and the Q component in which the distortion have been compensated and a known signal for each symbol and optimizing the first and second coefficients of each term independently.

* * * * *